United States Patent
Jung et al.

(10) Patent No.: US 10,259,943 B2
(45) Date of Patent: Apr. 16, 2019

(54) METHOD FOR MANUFACTURING PLATE ALPHA-ALUMINA PEARLESCENT PIGMENTS AND NANO-METAL COATING PEARLESCENT PIGMENTS WITH LARGE ASPECT RATIO

(71) Applicant: CQV CO., LTD., Jincheon-gun, Chungcheongbuk-do (KR)

(72) Inventors: Myung-Ho Jung, Chungcheongbuk-do (KR); Kyung-Jun Han, Chungcheongbuk-do (KR); Jae-Il Jeong, Cheongiu-si (KR); Kwang-Choong Kang, Cheongiu-si (KR); Byung-Ki Choi, Chungcheongbuk-do (KR); Kwang-Soo Lim, Cheongiu-si (KR); Kil-Wan Chang, Chungcheongbuk-do (KR); Jae-Soo Choi, Daejeon (KR); Beom-Jae Lee, Daejeon (KR); Jung-Min Lee, Daejeon (KR)

(73) Assignee: CQV CO., LTD., Chungcheongbuk-do (KR)

(*) Notice: Subject to any disclaimer, the term of this patent is extended or adjusted under 35 U.S.C. 154(b) by 0 days.

(21) Appl. No.: 14/779,494

(22) PCT Filed: Feb. 14, 2014

(86) PCT No.: PCT/KR2014/001212
§ 371 (c)(1),
(2) Date: Sep. 23, 2015

(87) PCT Pub. No.: WO2014/157832
PCT Pub. Date: Oct. 2, 2014

(65) Prior Publication Data
US 2016/0046812 A1   Feb. 18, 2016

(30) Foreign Application Priority Data
Mar. 29, 2013   (KR) .................. 10-2013-0034138

(51) Int. Cl.
  *B05D 5/00*   (2006.01)
  *C09C 1/00*   (2006.01)
  (Continued)

(52) U.S. Cl.
  CPC .............. *C09C 1/0015* (2013.01); *B05D 5/00* (2013.01); *B05D 7/5483* (2013.01); *C09C 1/40* (2013.01);
  (Continued)

(58) Field of Classification Search
  CPC ................................. C09C 1/0015; B05D 5/00
  (Continued)

(56) References Cited

U.S. PATENT DOCUMENTS

| | | | | |
|---|---|---|---|---|
| 5,702,519 A * | 12/1997 | Nitta | ......... | A61K 8/26 106/442 |
| 8,039,183 B2 * | 10/2011 | Veregin | ......... | G03G 9/08755 430/108.1 |
| 2010/0249304 A1 * | 9/2010 | Kitamura | ......... | C09C 1/0015 524/403 |

FOREIGN PATENT DOCUMENTS

| CN | 1654548 A | 8/2005 |
|---|---|---|
| CN | 101535419 A | 9/2009 |

(Continued)

OTHER PUBLICATIONS

Japanese Office Action dated Nov. 25, 2016 for Japanese Application No. 2016-505378.
(Continued)

*Primary Examiner* — Tabatha L Penny
(74) *Attorney, Agent, or Firm* — Hauptman Ham, LLP

(57) ABSTRACT

Disclosed is a method for manufacturing plate α-alumina pearlescent pigments and nano-metal coating pearlescent pigments with a large aspect ratio, having excellent reflectivity and capable of expressing various colors.

11 Claims, 1 Drawing Sheet

(51) Int. Cl.
    *C09C 1/40*     (2006.01)
    *B05D 7/00*     (2006.01)

(52) U.S. Cl.
    CPC ...... *C01P 2004/20* (2013.01); *C01P 2004/61* (2013.01); *C01P 2006/60* (2013.01); *C09C 2200/1004* (2013.01); *C09C 2200/301* (2013.01); *C09C 2220/10* (2013.01)

(58) Field of Classification Search
    USPC .......................................................... 427/214
    See application file for complete search history.

(56) References Cited

FOREIGN PATENT DOCUMENTS

| | | |
|---|---|---|
| CN | 101541681 A | 9/2009 |
| CN | 101675118 A | 3/2010 |
| JP | 7-268241 A | 10/1995 |
| JP | 2005-314649 A | 11/2005 |
| JP | 2010-502539 A | 1/2010 |
| JP | 2010500402 A | 1/2010 |
| JP | 2010-538096 A | 12/2010 |
| KR | 1019970015682 A | 4/1997 |
| KR | 100619248 B1 | 8/2006 |
| KR | 100743674 B1 | 7/2007 |
| KR | 100787191 B1 | 12/2007 |
| KR | 100853696 B1 | 8/2008 |
| WO | 2006101306 A1 | 9/2006 |
| WO | 2008026829 A1 | 3/2008 |
| WO | 2008026860 A1 | 3/2008 |
| WO | WO 2008026829 * | 3/2008 ............... C09C 1/40 |
| WO | WO 2008026860 * | 3/2008 ............... C09C 1/40 |
| WO | WO2012161412 * | 11/2012 ............ B82Y 30/00 |

OTHER PUBLICATIONS

Chinese Office Action dated Jul. 21, 2016 in connection with the counterpart Chinese Patent Application No. 201480019516.9.

International Search Report for PCT/KR2014/001212 dated May 9, 2014.

Extended European Search Report dated Mar. 15, 2016 in connection with the counterpart European Patent Application No. 14776308.0.

Chinese Office Action dated Mar. 23, 2017 for Chinese Application No. 201480019516.9.

* cited by examiner

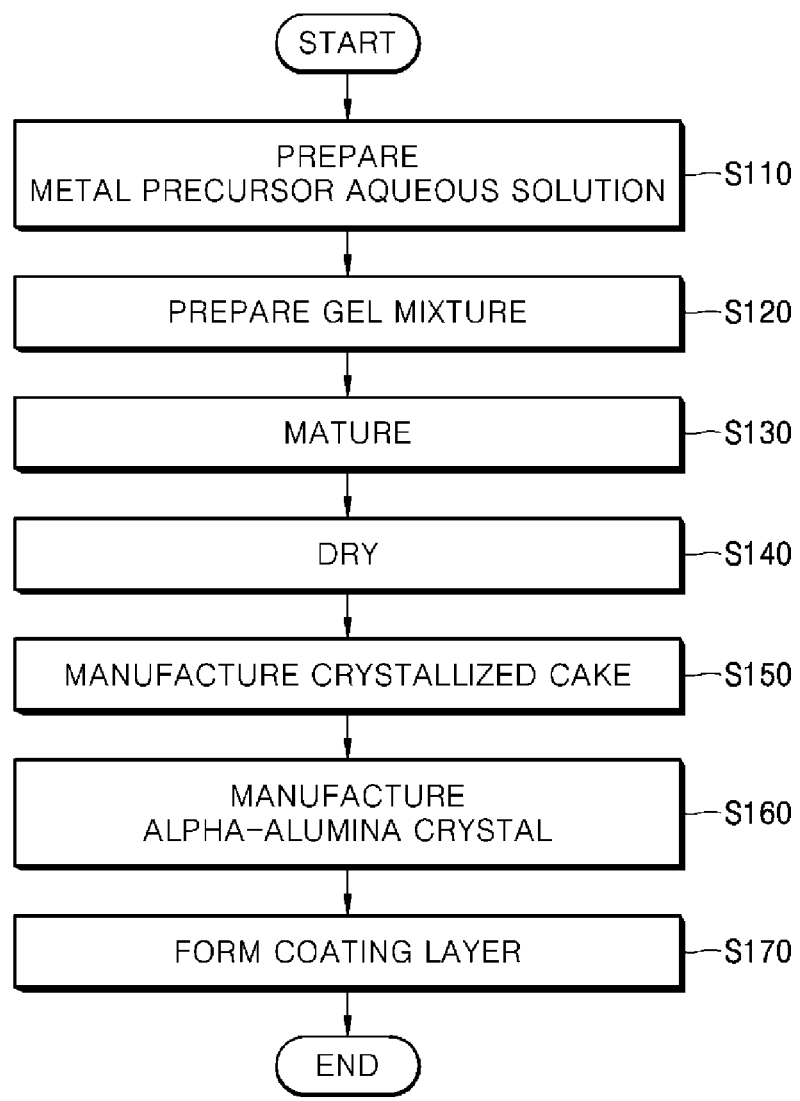

METHOD FOR MANUFACTURING PLATE ALPHA-ALUMINA PEARLESCENT PIGMENTS AND NANO-METAL COATING PEARLESCENT PIGMENTS WITH LARGE ASPECT RATIO

CROSS REFERENCE TO RELATED APPLICATION

This application claims the priority of Korean Patent Application No. 10-2013-0034138, filed Mar. 29, 2013 in the KIPO (Korean Intellectual Property Office). Further, this application is the National Phase application of International Application No. PCT/KR2014/001212 filed Feb. 14, 2014, which designates the United States and was published in Korean.

TECHNICAL FIELD

The present invention relates to a method for manufacturing plate alpha-alumina pearlescent pigments and nano-metal coating pearlescent pigments with a large aspect ratio, and more specifically, to a method for manufacturing plate alpha-alumina pearlescent pigments and nano-metal coating pearlescent pigments with a large aspect ratio, capable of having excellent reflectance and expressing various colors by forming a multi-coating layer on a plate alumina in manufacturing the pearlescent pigments with a large aspect ratio.

BACKGROUND ART

Pearlescent pigments are commonly called pigments expressing pearlescent, iridescent, metallic shine. The pearlescent pigments are mainly manufactured by hydrothermal synthesis. However, recently, thin-film pigments are manufactured by sputtering or chemical vapor deposition (CVD) from foreign companies. The pearlescent pigments manufactured by the hydrothermal synthesis have disadvantages in that at the time of coating a metal and a metal oxide, gloss is not excellent since a refractive index is low, a surface is not flat, and a particle size distribution is not uniform. In addition, the thin-film pearlescent pigments manufactured by sputtering or CVD also have disadvantages in that productivity is reduced as compared to other processes.

A particle size, a shape, surface properties, refractive index, and the like, are important as characteristics of the pearlescent pigments. That is, since a large particle and a small particle have different ratio between a reflected light on a particle surface and a transmitted light transmitting particles, size of the particles needs to be uniform in order to obtain generally vivid colors. However, at the time of coating the metal or the metal oxide, it is difficult to form a uniform coating layer and an aspect ratio is decreased, and eventually, light reflectance is reduced, which deteriorates an interference effect. Therefore, it is required to have a particle size which is sufficiently uniform in implementing various pearl colors by light interference.

As the related art associated with the present invention, there is Korean Patent Publication No. 10-0853696 (Aug. 18, 2008), which discloses a method for manufacturing a plate alpha-alumina and a nano-metal coating pearlescent pigments with various colors and a large aspect ratio.

DISCLOSURE

Technical Problem

An aspect of the present invention is to provide a method for manufacturing pearlescent pigments having a multi-coating layer, the method including manufacturing a plate alumina crystal containing aluminum oxide, zinc oxide, and tin oxide as main components and then forming a metal oxide and a fine polymer particle layer thereon.

Another aspect of the present invention is to provide alpha-alumina pearlescent pigments with a large aspect ratio capable of having excellent reflectance and expressing various colors, manufactured by the above-described manufacturing method.

Technical Solution

In accordance with one aspect of the present invention, a method for manufacturing pearlescent pigments includes: preparing a metal precursor aqueous solution by mixing a precursor aqueous solution including 3 to 6 wt % of a zinc precursor, 1 to 3 wt % of a tin precursor, and a remaining amount of aluminum oxide based on 100 parts by weight of an aluminum precursor; preparing a gel mixture by titrating the metal precursor aqueous solution to pH 6.0 to 8.0 with a sodium salt aqueous solution, followed by hydrolysis; maturing the gel mixture at a temperature of 60 to 100° C. for 4 to 30 hours; drying the matured gel mixture at a temperature of 60 to 200° C. for 5 to 20 hours; manufacturing a crystallized cake by crystallizing the dried gel mixture at a temperature of 850 to 1,300° C. for 2 to 10 hours; manufacturing an alpha-alumina crystal by cooling the crystallized cake to room temperature and dispersing the cooled crystallized cake with 0.5 to 35% sulfuric acid solution at a temperature of 20 to 100° C., followed by filtration, washing, and drying; and forming a coating layer by forming a multi-coating layer having at least two layers on the alpha-alumina crystal.

In accordance with another aspect of the present invention, pearlescent pigments include: 3 to 6 wt % of a zinc precursor, 1 to 3 wt % of a tin precursor, and a remaining amount of aluminum oxide based on 100 parts by weight of an aluminum precursor, wherein a composite coating layer having at least two layers formed of different materials, is provided on a surface of the pearlescent pigment.

Advantageous Effects

The plate alpha-alumina pearlescent pigments with a large aspect ratio according to the present invention may have excellent gloss degree by forming coating layers which are a metal compound and a fine polymer particle layer on an alpha-alumina crystal containing aluminum oxide, zinc oxide, and tin oxide at a predetermined component ratio to satisfy that a thickness is 0.1 to 2.0 µm, a diameter is 10 to 50 µm, and an aspect ratio is 150 or more.

DESCRIPTION OF DRAWINGS

FIG. 1 is a process flow chart illustrating a method for manufacturing pearlescent pigments according to an exemplary embodiment of the present invention.

BEST MODE

Advantages and features of the present invention and methods to achieve them will be elucidated from exemplary embodiments described below in detail with reference to the accompanying drawings. However, the present invention is not limited to exemplary embodiment disclosed herein but will be implemented in various forms. The exemplary embodiments are provided by way of example only so that a person of ordinary skilled in the art can fully understand the disclosures of the present invention and the scope of the present invention. Therefore, the present invention will be defined only by the scope of the appended claims. Like reference numerals refer to like components throughout the specification.

Hereinafter, a method for manufacturing plate alpha-alumina pearlescent pigments and nano-metal coating pearlescent pigments with a large aspect ratio according to the exemplary embodiments of the present invention is described below in detail with reference to the accompanying drawings.

FIG. 1 is a process flow chart illustrating a method for manufacturing pearlescent pigments according to an exemplary embodiment of the present invention.

Referring to FIG. 1, the method for manufacturing pearlescent pigments according to an exemplary embodiment of the present invention illustrated in FIG. 1 includes: preparing a metal precursor aqueous solution S110, preparing a gel mixture S120, maturing the gel mixture S130, drying the matured gel mixture S140, manufacturing a crystallized cake S150, manufacturing an alpha-alumina crystal S160, and forming a coating layer S170.

The present invention relates to a novel plate alpha-alumina crystal formed by containing aluminum oxide, zinc oxide, and tin oxide as main components at a predetermined component ratio, and more specifically, plate alpha-alumina pearlescent pigments with a large aspect ratio, satisfying a thickness of 0.1 to 2.0 µm, an average particle size of 10 to 50 µm, and an aspect ratio of 150 or more by distributing the tin oxide on a crystal surface of aluminum to promote reduction of thickness and growth of particles and prevent agglomeration.

In the preparing of the metal precursor aqueous solution S110, the metal precursor aqueous solution is prepared by mixing an aluminum precursor, a zinc precursor and a tin precursor containing a water-soluble solvent.

The aluminum precursor is generally used in the art, which is not specifically limited. The aluminum precursor may be selected from the group consisting of acid salts, halides, and oxides of aluminum, and more specifically, may be selected from the group consisting of aluminum sulfate, aluminum nitrate and aluminum chloride.

In addition, the zinc precursor is generally used in the art, which is not specifically limited. The zinc precursor may be selected from the group consisting of acid salts, halides, and oxides of zinc, and more specifically, may be selected from the group consisting of zinc sulfate, zinc nitrate and zinc chloride.

Further, the tin precursor is generally used in the art, which is not specifically limited. The zinc precursor may be selected from the group consisting of acid salts, halides, and oxides of zinc, and more specifically, may be selected from the group consisting of zinc sulfate, zinc nitrate and zinc chloride.

Among the precursors, aluminum sulfate is preferred to be used in view of hydrolysis property, chemical affinity with a solvent, and easiness in forming a water-soluble salt so as to be easily separated from a plate crystal in water after crystallization, and zinc sulfate and tin sulfate are preferably selected to be used in view of excellent chemical affinity with aluminum sulfate, reduction in thickness of the plate crystal, and prevention of agglomeration.

The zinc precursor is preferably added at an amount of 3 to 6 wt % based on 100 parts by weight of the aluminum precursor. When an amount of the zinc precursor is less than 3 wt %, it may be difficult to prevent agglomeration of a plate alpha-alumina crystal, and the aspect ratio may be reduced due to an increase in thickness. On the contrary, when an amount of the zinc precursor is more than 6 wt %, zinc oxides function as impurities in a crystallization process, which promotes heterogeneous nucleation, thereby causing a crystal having a small size.

The tin precursor is preferably added at an amount of 1 to 3 wt % based on 100 parts by weight of the aluminum precursor. When an amount of the tin precursor is less than 1 wt %, it may be difficult to increase a size of the plate alumina crystal. On the contrary, when an amount of the tin precursor is more than 3 wt %, a thickness of the plate alumina crystal may be increased, which may reduce the aspect ratio.

In the preparing of the gel mixture S120, the gel mixture is prepared by titrating the metal precursor aqueous solution to pH 6.0 to 8.0 with a sodium salt aqueous solution, followed by hydrolysis.

The sodium salt aqueous solution is generally used in the art, which is not specifically limited. The sodium salt aqueous solution is preferably one or two or more selected from the group consisting of sodium carbonate, sodium hydrogen carbonate, sodium hydroxide and sodium phosphate.

In the maturing S130, the gel mixture is allowed to mature and dried.

The maturing is preferably performed at a temperature of 60 to 100° C. for 4 to 30 hours. When a temperature for the maturing is less than 60° C., it is difficult to grow a pseudo-boehmite crystal included in the gel mixture. On the contrary, when the temperature for the maturing is more than 100° C., it is difficult to form the plate crystal due to change in a shape of the pseudo-boehmite crystal by a hydrothermal reaction.

In addition, when a time for the maturing is less than 4 hours, a uniform gel mixture is not capable of being obtained and it is difficult to grow the pseudo-boehmite, such that a plate alpha-alumina crystal having severe agglomeration is manufactured. On the contrary, when the time for the maturing is more than 30 hours, a plate alpha-alumina crystal having a thick thickness due to excessive growth of the pseudo-boehmite is manufactured.

The mixing, the hydrolysis, and the maturing processes promote production and growth of the pseudo-boehmite and uniform dispersion of the gel mixture, and easily form a plate body by agglomerating needle-like gamma alumina in a crystallization process, and distribute zinc oxides on a surface of the plate alpha-alumina crystal, thereby promoting reduction of thickness and growth of particles and preventing agglomeration.

In the drying S140, the matured gel mixture is dried to sufficiently remove moisture, thereby preventing a catalytic action of moisture in the crystallization process.

The drying is preferably performed at a temperature of 60° C. to 200° C. for 5 to 20 hours. When a temperature for the drying is less than 60° C., the drying is not capable of being performed, and when the temperature for the drying is more than 200° C., the gel mixture is excessively dried and contracted to form a firm and dry gel, which is overlapped with the formation of the plate body by agglomeration of the pseudo-boehmite, and accordingly, there is a problem that a non-uniform plate body is formed.

In addition, when a time for the drying is less than 5 hours, since the drying is not sufficiently performed, the catalytic action of moisture occurs in the crystallization process. On the contrary, when the time for the drying is more than 20 hours, an effect obtained by the drying is not expected any more, but the manufacturing cost is increased.

In the manufacturing of the crystallized cake S150, the gel mixture obtained through the maturing and drying steps is formed into a plate body having a sufficient size by agglomerating the needle-like particles before phase transition into the alpha-alumina, so that a molten salt having uniform concentration without temperature gradient is formed.

The crystallization is preferably performed at a temperature of 850° C. to 1,300° C. for 2 to 10 hours. When a temperature for the crystallization is less than 850° C., it is impossible to manufacture the plate alpha-alumina crystal. When the temperature for the crystallization is more than 1,300° C., sulfur (S) forming the solvent is left, such that it is difficult to maintain a molten salt, and accordingly, a plate crystal may be agglomerated, and further, the manufacturing cost may be increased due to large energy consumption.

In addition, when a time for the crystallization is less than 2 hours, the needle-like particles are not sufficiently agglomerated, such that it is difficult to form the plate body. On the contrary, when the time for the crystallization is more than 10 hours, the plate crystal body is excessively agglomerated, such that a thickness of the crystal of the plate alpha-alumina may exceed the preferable range of the present invention.

In the manufacturing of the alpha-alumina crystal S160, the alpha-alumina crystal satisfying a thickness of 0.1 to 2.0 μm, a diameter of 10 to 50 μm, and an aspect ratio of 150 or more, is formed by cooling the crystallized cake, followed by washing and drying.

The crystallized cake is cooled to room temperature, and dispersed with 0.5 to 35% sulfuric acid solution at a temperature of 20° C. to 100° C., followed by filtration, washing, and drying, to obtain a plate alpha-alumina crystal. When a concentration of the sulfuric acid is less than 0.5%, it is difficult to disperse the plate alpha-alumina crystal. On the contrary, when the concentration of the sulfuric acid is more than 35%, an effect obtained by the dispersion is not expected any more, but the cost for treating waste water is increased.

In the forming of the coating layer S170, a multi-coating layer is preferably formed by forming a metal-containing layer including a metal compound and a fine polymer particle layer on the alumina crystal.

The multi-coating layer may provide pearlescent pigments with various colors by depositing the metal compound and the fine polymer particle layer on the alpha-alumina crystal by physical vapor deposition (PVD) or chemical vapor deposition (CVD).

First, a coating layer is formed at a thickness of 50 to 100 nm by coating the metal compound on at outer peripheral surface of the alpha-alumina crystal. The metal-containing layer may be formed of at least one metal compound selected from the group consisting of $TiO_2$, $ZrO_2$, $Sb_2O_3$, ZnS, $SnO_2$, ZnO, $CaF_2$, $MgF_2$, ZnS, and $Fe_2O_3$.

The metal-containing layer and the particle layer may be stacked to form the multi-coating layer having at least two layers, thereby forming pearlescent pigments capable of having excellent reflectance and expressing various colors.

Meanwhile, although not illustrated in the drawings, the method for manufacturing the pearlescent pigments according to the exemplary embodiment of the present invention may further include: after the forming of the coating layer S170, forming a cerium layer (not illustrated); and forming an aluminum oxide layer (not illustrated). As described above, humidity resistance and weather resistance may be secured by further coating the cerium layer and the aluminum oxide layer on the multi-coating layer.

In the forming of the cerium layer, pearlescent pigment powder having the multi-coating layer formed therein is mixed in clear water, followed by stirring and dispersion, to form a suspension having a solid content of 5 to 30 wt %. Then, $CeCl_3$ is dumped into the suspension, and the suspension was stirred for 10 to 60 minutes and heated at 50° C. to 100° C. When a time for stirring is more than 60 minutes, there is a risk that the coating layer may be damaged.

After the stirring is completed, pH of the suspension is controlled to be 1 to 4, and the suspension is subjected to reflux for 10 to 30 minutes, thereby forming the cesium layer at an outer portion of the multi-coating layer. Here, when pH is less than 1, the coating of the cerium coating layer is not normally performed. On the contrary, when pH is more than 4, since a coating material has significantly irregular size and shape, high chroma of the pigments may not be secured.

In the forming of the aluminum oxide layer, the suspension including the pearlescent pigments on which the cerium layer is coated is prepared to have a solid content of 5 to 30 wt %, and mixed with $Al(NO_3)_3$ solution in a state in which temperature is maintained at 60° C. to 100° C. Here, when the temperature of the suspension is less than 60° C., the formation of the aluminum oxide layer may not be properly performed. On the contrary, when the temperature of the suspension is more than 100° C., a reaction efficiency for forming the aluminum oxide layer may be deteriorated.

The suspension after the injection of $Al(NO_3)_3$ solution is completed is controlled to have pH ranging from 2 to 10, followed by reflux for 10 to 60 minutes. Here, when pH is less than 2, the formation of the aluminum oxide layer is not normally performed. On the contrary, when pH is more than 10, since a coating material has significantly irregular size and shape, high chroma of the pigments may not be secured.

Further, a silane-coupling layer may be formed in order to maintain the state in which the cerium layer and the aluminum oxide layer are coated.

Example

Hereinafter, constitution and function of the present invention will be described in more detail through preferable exemplary embodiments of the present invention. Meanwhile, these exemplary embodiments are provided by way of example, and accordingly, should not be interpreted as limiting the scope of the present invention.

Descriptions which are not described in the specification can be sufficiently and technically deduced by a person skilled in the art, and accordingly, details thereof will be omitted.

Pearlescent pigments of Examples 1 to 3 and Comparative Examples 1 and 2 were manufactured by compositions of Table 1 and process conditions of Table 2. In addition, a thickness, a diameter, and an aspect ratio of each of the plate alpha-aluminas of Examples 1 to 3 and Comparative Examples 1 and 2 were measured and shown in Table 3.

TABLE 1

(Unit:wt %)

| Note | Zinc Precursor | Tin Precursor | Aluminum Oxide |
|---|---|---|---|
| Example 1 | 3.5 | 2 | 94.5 |
| Example 2 | 5 | 2.7 | 92.3 |
| Example 3 | 4.7 | 2.4 | 92.9 |
| Comparative Example 1 | 4 | 2.6 | 93.4 |
| Comparative Example 2 | — | 1.9 | 98.1 |

TABLE 2

| Note | Maturing Temperature (° C.) | Maturing Time (hr) | Drying Temperature (° C.) | Drying Time (hr) | Crystallization Temperature (° C.) | Crystallization Time (hr) |
|---|---|---|---|---|---|---|
| Example 1 | 75 | 12 | 123 | 12 | 1200 | 5 |
| Example 2 | 91 | 20 | 109 | 10 | 1100 | 8 |
| Example 3 | 83 | 18 | 94 | 9 | 1180 | 7 |
| Comparative Example 1 | 53 | 19 | 103 | 16 | 960 | 5 |
| Comparative Example 2 | 84 | 21 | 137 | 2 | 1140 | 5 |

TABLE 3

| Note | Thickness (μm) of Plate Alumina | Diameter (μm) of Plate Alumina | Aspect Ratio |
|---|---|---|---|
| Example 1 | 0.9 | 34 | 167 |
| Example 2 | 1.3 | 40 | 176 |
| Example 3 | 1.06 | 29 | 173 |
| Comparative Example 1 | 3.7 | 37 | 106 |
| Comparative Example 2 | 1.8 | 42 | 119 |

Referring to Tables 1 to 3, it could be appreciated that all of samples of Examples 1 to 3 satisfied a thickness 0.1 to 2.0 μm, a diameter of 10 to 50 μm, and an aspect ratio of 150 or more corresponding to target values of the present invention.

Meanwhile, it could be appreciated that as compared to Example 1, Comparative Example 1 in which a maturing temperature was below the desirable range of the present application, had a diameter satisfying the target value of the present invention, but could not obtain a uniform gel mixture through sufficient maturing, and accordingly, Comparative Example 1 did not have a thickness and an aspect ratio satisfying the target values of the present invention.

In addition, it could be appreciated that as compared Example 1, Comparative Example 2 in which a drying time was below the range of the present, had a thickness and a diameter satisfying the target values of the present invention, but a catalytic action of moisture occurring in a crystallization process, and accordingly, Comparative Example 2 did not have an aspect ratio satisfying the target value of the present invention.

The sample panels manufactured as described above were exposed at 60° C. for 200 hours under 100% humidity environment, and humidity resistance of the panels obtained therefrom was measured by adhesion test (ASTM D3359, Vol. 6). In addition, distinctness of image (DOI) was measured to determine weather resistance.

(Humidity resistance is ranked from 0B to 5B, wherein 0B means 65% or more of total cohesive failure, and 5B means no destruction at all.

In view of weather resistance, the pigments having high DOI had more excellent stability as compared to pigments having low DOI.)

TABLE 4

| Note | Whether Cerium Layer and Aluminum Oxide Layer are Coated | Humidity Resistance ASTM D3359, Vol. 6 | Weather Resistance (% DOI) |
|---|---|---|---|
| Example 1 | ○ | 5B | 98 |
| Example 2 | ○ | 5B | 95 |
| Example 3 | ○ | 5B | 97 |
| Comparative Example 1 | X | 1B | 40 |
| Comparative Example 2 | X | 0B | 38 |

Referring to Table 4, it could be appreciated that Examples 1 to 3 coated with the cerium layer and the aluminum oxide layer had excellent humidity resistance and weather resistance as compared to Comparative Examples 1 and 2 which were not coated with the cerium layer and the aluminum oxide layer.

Therefore, pearlescent pigments having excellent weather resistance may be obtained by further coating the cerium layer and the aluminum oxide layer on the multi-coating layer according to the present invention.

Although the exemplary embodiments of the present invention have been described, various changes and modifications can be made by those skilled in the art without the scope of the appended claims of the present invention. Therefore, the protection scope of the present invention needs to be determined by the spirit and scope of the appended claims to be described below.

The invention claimed is:

1. A method for manufacturing pearlescent pigments comprising:
   (a) preparing a metal precursor aqueous solution comprising 3 to 6 parts by weight of a zinc precursor, 1 to 3 parts by weight of a tin precursor, and 100 parts by weight of an aluminum precursor;
   (b) preparing a gel mixture by titrating the metal precursor aqueous solution to pH 6.0 to 8.0 with a sodium salt aqueous solution, followed by hydrolysis;
   (c) maturing the gel mixture at a temperature of 60 to 100° C. for 4 to 30 hours;
   (d) drying the matured gel mixture at a temperature of 60 to 200° C. for 5 to 20 hours;
   (e) manufacturing a crystallized cake by crystallizing the dried gel mixture at a temperature of 850 to 1,300° C. for 2 to 10 hours;
   (f) manufacturing an alpha-alumina crystal by cooling the crystallized cake to room temperature and dispersing the cooled crystallized cake with 0.5 to 35% sulfuric acid solution at a temperature of 20 to 100° C., followed by filtration, washing, and drying;
   (g) forming a plurality of coating layers on the alpha-alumina crystal, wherein the plurality of coating layers comprises at least one metal-containing layer and at least one polymer particle layer stacked on each other;
   (h) coating a cerium layer on the plurality of coating layers formed on the alpha-alumina crystal; and
   (i) coating an aluminum oxide layer on the cerium layer, wherein the alpha-alumina crystal of step (f) has a thickness ranging from 0.9 μm to 2.0 μm, a diameter ranging from 29 μm to 40 μm, and an aspect ratio of 167 or more.

2. The method of claim 1, wherein the at least one metal-containing layer comprises at least one metal compound selected from the group consisting of: $TiO_2$, $ZrO_2$, $Sb_2O_3$, ZnS, $SnO_2$, ZnO, $CaF_2$, $MgF_2$, ZnS, and $Fe_2O_3$.

3. The method of claim 1, wherein forming the plurality of coating layers on the alpha-alumina crystal comprises depositing a metal compound or a polymer particle of the at least one polymer particle layer on the alpha-alumina crystal by a physical vapor deposition (PVD) or a chemical vapor deposition (CVD).

4. The method of claim 1, wherein coating the cerium layer on the plurality of coating layers comprises:
suspending the alpha-alumina crystal obtained in step (g) in an suspension;
dissolving cerium chloride in the suspension;
stirring the suspension;
adjusting a pH of the suspension; and
subjecting the suspension to a reflux.

5. The method of claim 4, wherein suspending the alpha-alumina crystal obtained in step (g) in the suspension comprises forming the suspension having a solid content of 5 to 30 wt %.

6. The method of claim 5, wherein stirring the suspension comprises stirring the suspension at a temperature of 50° C. to 100° C. for 10 minutes to 60 minutes.

7. The method of claim 5, wherein adjusting the pH of the suspension comprises adjusting the pH of the suspension to a range of 1 to 4.

8. The method of claim 1, wherein coating the aluminum oxide layer on the cerium layer comprises:
suspending the alpha-alumina crystal obtained in step (h) in a suspension;
mixing the suspension with aluminum nitrate;
adjusting a pH of the suspension; and
subjecting the suspension to a reflux.

9. The method of claim 8, wherein suspending the alpha-alumina crystal obtained in step (h) in the suspension comprises forming the suspension having a solid content of 5 to 30 wt %.

10. The method of claim 8, wherein mixing the suspension with an aluminum salt comprises mixing the suspension with the aluminum salt while maintaining a temperature of the suspension at 60° C. to 100° C.

11. The method of claim 8, wherein adjusting the pH of the suspension comprises adjusting the pH of the suspension to a range of 2 to 10.

* * * * *